(12) United States Patent
Berducat

(10) Patent No.: US 11,938,436 B2
(45) Date of Patent: Mar. 26, 2024

(54) VENT FILTER AND PURE LIQUID STORAGE TANK

(71) Applicant: Merck Patent GmbH, Darmstadt (DE)

(72) Inventor: Christian Berducat, Saint-Mandé (FR)

(73) Assignee: Merck Patent GmbH, Darmstadt (DE)

( * ) Notice: Subject to any disclaimer, the term of this patent is extended or adjusted under 35 U.S.C. 154(b) by 412 days.

(21) Appl. No.: 17/273,094

(22) PCT Filed: Sep. 5, 2019

(86) PCT No.: PCT/EP2019/073648
§ 371 (c)(1),
(2) Date: Mar. 3, 2021

(87) PCT Pub. No.: WO2020/049078
PCT Pub. Date: Mar. 12, 2020

(65) Prior Publication Data
US 2021/0220768 A1    Jul. 22, 2021

(30) Foreign Application Priority Data

Sep. 7, 2018 (EP) ..................................... 18290097

(51) Int. Cl.
*B01D 53/04* (2006.01)
*B01D 46/30* (2006.01)

(52) U.S. Cl.
CPC ......... *B01D 46/30* (2013.01); *B01D 53/0415* (2013.01); *B01D 2253/102* (2013.01);
(Continued)

(58) Field of Classification Search
CPC .... B01D 46/30; B01D 53/04; B01D 53/0415; B01D 2253/102; B01D 2253/108;
(Continued)

(56) References Cited

U.S. PATENT DOCUMENTS 4,504,289 A * 3/1985 Waller ................. B01D 53/261
                                                       55/318
4,612,026 A * 9/1986 Pollara ............... B01D 53/0446
                                                       96/135
(Continued)

FOREIGN PATENT DOCUMENTS

CN     101210910 A    7/2008
CN     103826722 A    5/2014
(Continued)

OTHER PUBLICATIONS

International Search Report and Written Opinion dated Nov. 5, 2019 in corresponding PCT application No. PCT/EP2019/073648.
(Continued)

*Primary Examiner* — Frank M Lawrence, Jr.
(74) *Attorney, Agent, or Firm* — NIELDS, LEMACK & FRAME, LLC

(57) ABSTRACT

A vent filter (1), preferably for a pure liquid storage tank, comprising a cylindrical shell (2), at least one compartment (A) for accommodating granular filter material (3), said at least one compartment (A) defined between an inner peripheral surface (4) of the shell (2) and a pair of spaced apart separator plates (5) arranged in the shell (2) such that the spacing of the separator plates (5) in the axial direction of the shell (2) can be changed and fixed so as to apply a pressure on the granular filter material (3) in the at least one compartment (A). An air inlet (6) and an air outlet (7) are respectively arranged to allow a flow of air through the granular filter material (3) in the at least one compartment (A).

15 Claims, 2 Drawing Sheets

(52) U.S. Cl.
  CPC .................. *B01D 2253/108* (2013.01); *B01D 2253/1126* (2013.01); *B01D 2259/40084* (2013.01); *B01D 2259/4525* (2013.01)

(58) Field of Classification Search
  CPC .. B01D 2253/1126; B01D 2249/40084; B01D 2249/4525
  USPC ........................... 55/385.4; 96/137, 147–149
  See application file for complete search history.

(56) References Cited

U.S. PATENT DOCUMENTS

| | | | | |
|---|---|---|---|---|
| 5,226,938 | A * | 7/1993 | Bailey .................... | B01D 50/20 55/366 |
| 5,538,542 | A * | 7/1996 | Watanabe .......... | B01D 53/0446 95/146 |
| 5,843,212 | A * | 12/1998 | Nanaji ................... | B01D 53/22 96/174 |
| 6,217,639 | B1 * | 4/2001 | Jackson ............. | B01D 53/0415 96/147 |
| 6,309,450 | B1 * | 10/2001 | Millen ............... | B01D 53/0415 96/135 |
| 7,127,908 | B2 * | 10/2006 | Flaugher .............. | B01D 53/261 62/271 |
| 10,427,081 | B1 * | 10/2019 | Newman ............ | B01D 53/0415 |
| 2005/0139068 | A1 * | 6/2005 | Kim ................... | B01D 53/0446 95/56 |
| 2008/0155946 | A1 | 7/2008 | Wang et al. | |
| 2015/0075380 | A1 | 3/2015 | Lahaye et al. | |
| 2015/0151992 | A1 | 6/2015 | Mortimer et al. | |
| 2015/0273379 | A1 * | 10/2015 | McVay .................. | B01D 46/30 96/108 |
| 2017/0028342 | A1 * | 2/2017 | Zastera .............. | F02M 25/0854 |

FOREIGN PATENT DOCUMENTS

| | | |
|---|---|---|
| CN | 104168977 A | 11/2014 |
| JP | 2009-95744 A | 5/2009 |

OTHER PUBLICATIONS

Chinese communication, with English translation, dated Mar. 30, 2022 in corresponding Chinese patent application No. 201980058262.4.

Japanese communication, with English translation, dated May 24, 2023 in corresponding Japanese patent application No. 2021-512654.

* cited by examiner

VENT FILTER AND PURE LIQUID STORAGE TANK

The present invention relates to a vent filter, in particular for use with a pure liquid storage tank, and to a pure liquid storage tank provided with a vent filter. The vent filter and the liquid storage tank are in particular intended for a pure water storage tank.

BACKGROUND

Vent filters are commonly used on liquid storage tanks to supplement the liquid dispensed from the tank by ambient air and to maintain the liquid pure. The vent filter is to remove airborne contaminants from the ambient air like volatile organic compounds, carbon dioxide and particles entering the pure liquid tank through the vent filter.

The filtering capacity and through-put of the vent filter is to be adapted to the volume of liquid extracted from the tank. In cases of pure water tanks for laboratory use, which is a preferred field of application for the present invention, extraction flow rates can be up to 30 L/min in particular were the tank is connected to external machines requiring purified water such as a washing machine. While small air vents for lower rates in the range of 2 L/min requires only small quantities of filter material in the order of millilitres, higher flow rates up to 10 L/min or more require hundreds of millilitres of volume of the filter material, not necessarily only due to the capacity alone, but also for adsorption kinetic which depends on the filter material chosen.

The present invention is particularly designed for use in connection with the storage of ultra-pure water (UPW) which has a resistivity of 18.2 MΩ*cm and a total organic carbon (TOO) below 5 ppb and it is produced by polishing pure water. The production of pure water is a slower flow process than the polishing to produce the ultra-pure water. Therefore, in a system to produce ultra-pure water, the pure water must be stored or buffered in a tank. This tank is equipped with an air vent filter that purifies the air coming into the tank. The higher the flow rate of ultra-pure water, the higher needs to be the filtration kinetics of the vent filter. Therefore, higher flow rates require an increased volume of the vent filter.

A pure water storage tank for laboratory use is typically dimensioned with a volume of around 20-100 L. Vent filters for use in such application particularly utilize a combination of filter materials including activated carbon to filter volatile organic substances or solvents, soda lime for filtering carbon dioxide, and a membrane filter for filtering bacteria, dust or alike particles. For lower purity requirements a membrane filter only may be used. Industrial air filtration uses three mechanisms of particle retention: inertial impact, interception, and diffusive adsorption. The dominant removal mechanisms can vary as a function of particle size. The flow rate of the air and the change of flow rate over time also influences the effective removal mechanism and is therefore specific for the field of use.

Chemical adsorption by using soda lime is the state of the art solution for $CO_2$ removal in air filters. Other substances may be effective depending on the particular field of application. An alternative chemical reagent used in $CO_2$ removal media may be lithium hydroxide but the $CO_2$ capture reaction is fundamentally different from that of soda lime.

The main and major ingredient of soda lime is calcium hydroxide. Water and a small amount of sodium hydroxide are added. $CO_2$ contained in atmospheric air indirectly reacts with $Ca(OH)_2$ in a two-step exothermic reaction. The resulting water that is originally in the soda lime as well as by-product water may evaporate and is lost.

As the filter material is spent in use, the vent filter for such applications is normally in the form of a cartridge that is designed to allow simple and, if necessary, repeated exchange and replacement on the tank.

Current pure water storage tank designs for use in laboratory applications have the vent filter in the form of a cartridge on the top of the tank in a vertically oriented chimney-like form. Since water purification systems and water storage tanks are often installed in unused spaces in a laboratory such as under lab benches and lab sinks, the integration imposes limits on the height of the tank. In addition, a chimney-like air vent in currently known solutions reduces the available space in the installation further. The vent-on-top design requires head space for the vent filter and additional service space for the replacement when the tank is entirely confined in furniture or under lab bench or sink.

There are several attempts to address the space limitation and one is the use of a horizontally oriented vent filter. In one existing design the cartridge is attached to and detached from a receptacle within the tank body by a horizontal movement. However, this solution is realized with several drawbacks. The vent filter cartridge is in a form factor having a large diameter and a flat body in horizontal orientation. Air vents containing purification media other than a filter must be absolutely dry. Therefore, the cartridge body cannot be submerged in water stored in the tank. Thus, the water level must be clearly below the vent cartridge level which in return reduces the volume available for storing the liquid in the tank. The space utility efficiency is therefore poor.

Another feasible solution is the placement of a vent filter in the form of a small diameter elongated column at the top of tank in a horizontal orientation. Installation and replacement are done by horizontal movement of the cartridge so that no additional head room for servicing is required.

On the other hand, soda lime or other granular media commonly used as a filter material in a columnar design filter to adsorb and remove $CO_2$ from air requires a dense packing. The contact time, i.e. ratio of media volume to flow rate is an important parameter to good adsorption performance. For example, slower air flow in media cartridge and longer air-media contact time yields better $CO_2$ adsorption. On the other side, when two columns of same media volume are envisaged, the ratio of diameter and height plays a role with respect to efficiency. If a narrow and tall column compared to a wide and short column with the same volume are operated under the same condition, the linear velocity is faster. The faster velocity generates less mass transfer boundary that accelerates adsorption phenomenon on each granular media particle. The sole disadvantage is an increased pressure drop.

Loosely packed granular material in a column that is oriented horizontally creates a risk of partial or total bypass flow that dramatically degrades adsorption performance. Partial voids may be created at the one or both ends of the media bed with the consequence that, at the void zone, purification media is not fully used. A continuous void may be formed when media filling is not perfect. In this case, a total flow-through bypass is generated in the column. Naturally, air passes through the route where flow restriction is minimum. This column may entirely lose its expected performance.

There are several ways to pack granular or particulate media in a column with certain industrial solutions. These solutions are, however, not applicable for vent filters intended to be used with pure water storage tanks. One known solution is based on the use of a foam to compress the granular media to avoid loose packing and generation of voids. The foam itself is porous and is considered as a material sufficiently permeable for the air to be filtered. However, depending on the way of manufacturing of foam based on plastics or polymers, pores are generated by gas inflation or phase inversion of porogen solvent and pore continuity may not be well developed. In addition, a foam used as compression device deforms with deformation of the porous structure. The compression of foam tends to close pores which is an additional constraint to permeability. Lastly, in the case of foam compression, compression efficiency may be lost over time as compressed foam often loses its elasticity.

Another possible solution is the use of a porous disk that is mechanically pressed by using a spring or another biasing element. However, the spring load as well as foam compression leave permanent stress on the granular media. Unlike other granular media such as ion exchange resins and spherical activated carbons, soda lime and alternative $CO_2$ removal media in granular format is fragile. Stress to granular media, possibly combined with mechanical shock during transport may damage the media and may generate fine particles or dust. Damage to granular material results in abrasion of the media that loosens the media packing. Further, the generated fine particles create additional flow restrictions since packed granular media with smaller particle size has a higher pressure drop.

A still further feasible solution is the use of a porous disk maintained by friction only at a boundary for retaining and confining a volume of granular material in a cylindrical container. Specific forms of disk edge, possible combined with the use of an additional sealing material such as elastomer O-rings allow good fitting to an inner wall surface of the column, i.e. the container. However, vibration and shocks to the cartridge during transport and handling can move such disk and the packing of the media may become loose. Only strong friction assures the integrity of disk fixation with some drawback that the strong friction requires a strong force to insert the disk into the column. Since it is difficult to detect the end position of insertion of the disk, the insertion force, either mechanically or manually applied, may compress and damage fragile filtration media. Tilting or rotation of such a compression disk is also a known possible defect. To reduce the risk of this deficiency the compression disk must be thick enough in an axial direction to avoid tilting in the column, which, however, sacrifices the effective volume of media in the column.

Finally, the packing of granular filter material in a column has another aspect of difficulties. When granular filter media is put in a cartridge, column or container, the intended packed density is not guaranteed. In case of small and spherical media, free-fall filling in a container can initially produce the maximum bed volume but then the volume will be reduced when the container is mechanically tapped. Irregular shaped media or imperfect granulometry media can behave oppositely: first free-fall filling takes the minimum bed volume and then shaking of the container loosens the packing. Thus, depending on the filling way, the volume or dose is variable.

Object of Invention

The invention aims at providing a vent filter, preferable for a pure liquid storage tank like a pure water storage tank, which allows for a space saving mounting on the tank, which reduces possible variation of filter efficiency due to voids and/or other packing variation and which reduces the stress to media in consequence of vibration or mechanical shocks during transport or handling. The invention also aims at providing a pure liquid storage tank like a pure water storage tank including such a vent filter.

Solution

The present invention provides a vent filter, preferably for a pure liquid storage tank. Preferred embodiments are defined in the dependent claims.

A vent filter according to the invention, preferably for a pure liquid storage tank, comprises a cylindrical shell, at least one compartment for accommodating granular filter material, said at least one compartment defined between an inner peripheral surface of the shell and a pair of spaced apart separator plates arranged in the shell such that the spacing of the separator plates in the axial direction of the shell can be changed and fixed so as to apply a pressure on the granular filter material in the at least one compartment, and an air inlet and an air outlet respectively arranged to allow a flow of air through the granular filter material in the at least one compartment.

Preferably, the vent filter further comprises a support member and a locking mechanism for allowing fixing of at least one of the separator plates in a plurality of defined positions in the axial direction of the shell on the support member.

Preferably, the at least one of the separator plates respectively comprises a frame and a screen supported by the frame, wherein the screen is configured to be air permeable and to retain the granular filter material.

Preferably, the frame comprises a circumferential rim configured to slidingly seal against the inner peripheral surface of the shell.

Preferably, the support member comprises a preferably central shaft extending in the axial direction of the shell and supporting the at least one of the separator plates thereon.

Preferably, the separator plate(s) has/have a hub supported on the shaft so as to be movable in the axial direction.

Preferably, the locking mechanism comprises one or more protrusions provided on the hub and configured to be engaged with plural recesses provided on the shaft to define the plural axial fixing positions for the hub.

Preferably, the separator plates are identical.

Preferably, the granular filter material comprises sodalime, activated carbon, LiOH and/or zeolithe.

Preferably, the vent filter comprising a further compartment upstream and/or downstream of the at least one compartment with respect to the flow direction of air through the vent filter from the inlet to the outlet.

Preferably, the inlet and/or the outlet is/are respectively formed on a lid member preferably removably attached to the shell to close a respective axial end opening(s) thereof.

The invention also provides a pure liquid storage tank, comprising a vent filter according to the invention having the outlet communicating with the interior volume of the tank and arranged on a top side of the tank such that the axial direction of the cylindrical shell of the vent filter extends in a substantial horizontal direction.

Preferably, the pure liquid storage tank comprises a link for connecting the vent filter to the tank so as to allow pivotal movement of the vent filter into and from the substantial horizontal orientation.

As compared to prior art vent filters the vent filter of the invention provides a number of advantages:

- no or substantially no pressure drop is created by the structure for retaining the granular filter material in the compartment as compared, for example, to the use of a foam;
- the integrity of the granular media which is fragile is preserved as the pressure on the beads or particles is lower and can be set in defined stages by moving the one or both separator plates along the axial direction of the shaft;
- the spaced-apart fixation of the separator plates on the rigid shaft forming a self-supporting unit avoids shifting or tilting of the separator plates in the shell or movement relative to the granular material which avoids the risk of damage to fragile granular material during transport and handling;
- the forming of voids at the axial ends or through the length of the compartment with the granular material is avoided even when the vent filter cartridge is operated with its axial extension in a horizontal orientation;
- the separator plates can be relatively thin as their support is achieved by means of the central shaft, thereby maximising the efficiency of the use of the limited space in the shell for accommodating the filtration media;
- the quantity of the granular material filled in the compartment can be varied depending on the number of fixation positions of the separator plate(s) along the length of the shaft, thereby accommodating different filling processes or types of granular material without having to modify the overall design of the vent filter. In case the granular material to be used in the vent filter is substantially different with respect to the particle size, the provision of different separator plates with different screen mesh sizes is sufficient to accommodate the material; and
- the manufacturing and assembly of the vent filter including the filling of the compartment with the granular material is simple as is does not require a specific tool and the risk that the separator plates are tilted or improperly mounted in the shell is reduced due to the fixation on the central shaft.

The present invention will be described in connection with the preferred embodiment by reference to the attached drawing. In the drawing.

Figure 1:
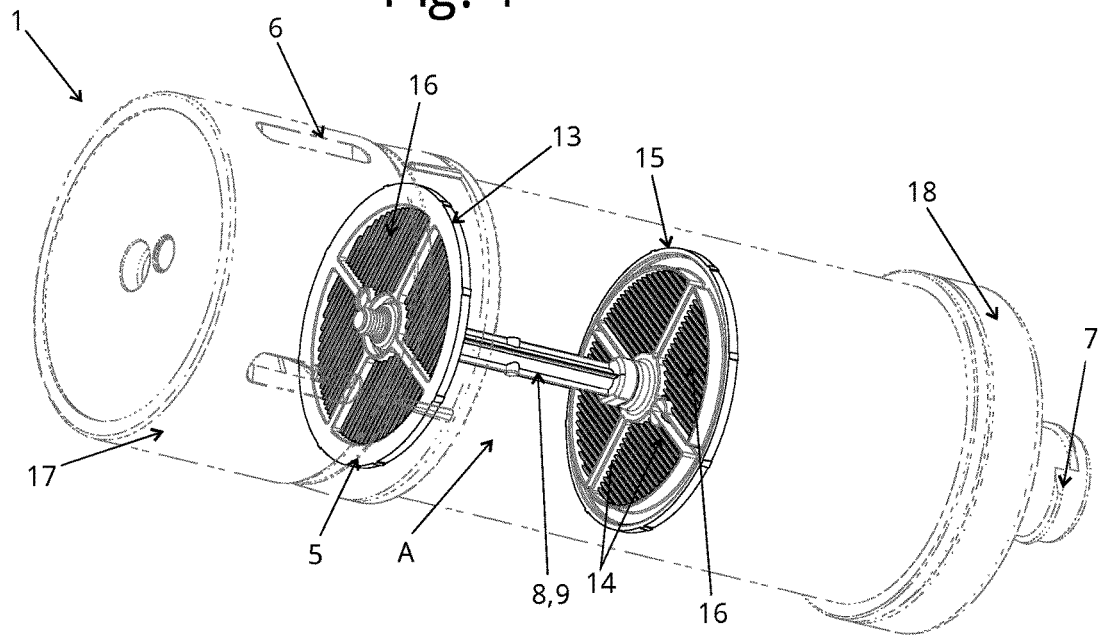
FIG. 1 is a perspective partial view of the vent filter cartridge of a preferred embodiment.

The vent filter 1 in the form of a vent filter cartridge according to a preferred embodiment shown in the drawing is in particular intended for use with the pure liquid storage tank, in particular a pure water storage tank for use in a laboratory environment.

The vent filter or vent filter cartridge comprises a cylindrical shell or container 2 surrounding at least one compartment A for accommodating granular or particular filter material 3. The at least one compartment A is defined between an inner peripheral wall surface 4 of the cylindrical shell 2 and a pair of spaced apart separator plates 5 arranged in the shell 2 such that the spacing of the separator plates 5 in the axial direction of the shell can be changed and fixed so as to apply a certain pressure on the granular filter material 3 in the at least one compartment A and maintain a given packing state.

The vent filter 1 in the form of a vent filter cartridge further has an air inlet 6 and an air outlet 7 respectively arranged at the ends of the vent filter 1 to allow a flow of air through the granular filter material 3 in the at least one compartment A (or optionally through further compartments and filter media as described below). The air inlet 6 is typically for ambient air and the air outlet 7 is for directing filtered air to the inner volume of the liquid storage tank to which the vent filter is mounted.

The variable spacing of the separator plates 5 in the shell 2 and the fixation of the separator plates 5 in their respective axial positions is achieved my means of a support member 8 and a locking mechanism for allowing fixing of at least one of the two separator plates 5 delimiting the at least one compartment A in a plurality of defined positions in the axial direction of the shell 2 on the support member 8. In the broadest understanding one of the separator plates 5 can be maintained in a fixed and unmovable position of the support member whereas only the other separator plate 5 can be movable and fixable in plural defined positions in the axial direction to allow filling of the granular filter material 3 into the compartment A and applying the defined pressure on the granular filter material.

In the preferred embodiment the separator plates 5 respectively comprise a frame 13 and a screen 16 supported by the frame 13. The screen 16 is designed to be air permeable and to retain the granular filter material 3 in the compartment. The frame 13 preferable comprises a circumferential rim or edge 15 configured to slideably seal against the inner prereferral wall surface 4 of the shell 2. An additional sealing device including an O-Ring, elastic sealing material or labyrinth-seal may be provided at the interface between the circumferential rim 15 and the wall surface 4 of the shell 2. The separator plates 5 (i.e. at least the one of the plates that is movable) respectively have a central hub 11 connected to the peripheral rim 13 by means of an arrangement of stays or spokes 14 which are designed to maximise the air throughput through the screen 16 and provide sufficient rigidity and stability of the separator plate 5. The separator plates can be different or can be preferably identical.

In the preferred embodiment the support member 8 comprises a preferably central shaft 9 extending in the axial direction of the shell 2 and supporting the at least one or both of the separator plates 5 thereon. The support of the separator plate(s) 5 on the enteral shaft 9 is by means of the central hub 11 and the hub 11 is either fixedly mounted on the central shaft at a single position, which can be the case for one of the separator plates, or is movable in the axial direction of the shaft 9 (which can thus be the case for one or both of the separator plates depending on the design of the vent filter).

The fixation of the movable separator plate(s) 5 is realized by means of a locking mechanism which, in case of the preferred embodiment shown in FIG. 4, comprises one or more protrusions 12 formed on or adjacent to the central bore of the hub 11 and configured to be engaged with plural recesses 10 provided over axial portions of the shaft 9 to define the plural axial fixing positions for the hub.

Figure 4A:
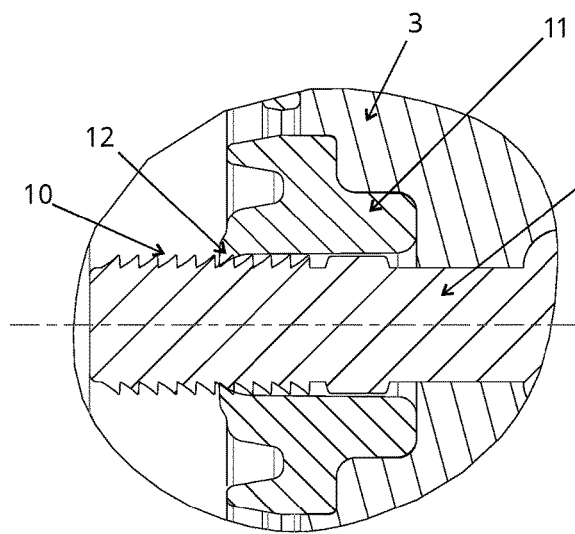
FIGS. 4A and 4B are magnified detail cross sectional views of the two extremities of the shaft with the locking mechanism of the embodiment of FIGS. 1 to 3.
Figure 4B:
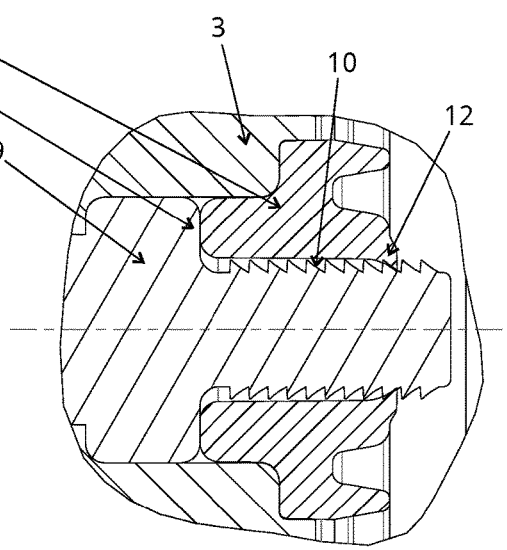

The protrusion(s) 12 and recesses 10 defining the locking mechanism for the separator plates on the shaft 9 can be respectively formed as circular notching spaced apart in parallel along the axial direction of the shaft 9 as shown in FIG. 4A/B or can be in the form of a spiral thread or other mechanical locking mechanisms along a portion of the axial length of the shaft. The locking mechanism in the form of the protrusions/recesses in the form of the notching is advantageous in that the movement and fixation of the movable separator plate(s) 5 in the plural defined positions can be achieved by only an axial movement without requiring rotation of the separator plate(s) 5 which could potentially grind, abrade or otherwise damage the granular material.

Another solution for the locking mechanism would be to provide a locking mechanism that engages with the axial portions of the shaft whereas the hub 11 is not directly fixed to the shaft, i.e. in the form of a nut or clamp placed outside the compartment A and engaging a thread of other mating engaging features to press the hub in the axial direction. The finer the axial spacing of the locking positions of the locking mechanism, the finer is the setting of the compression or compaction of the granular material in the compartment A. A threaded mechanism, for example, provides an unlimited number of locking positions within the threaded moving range.

The shaft 9 may have a seat 20 (see FIG. 4B) for defining an axial end position for the hub 11. Likewise, the inner peripheral wall surface of the shell 2 may also have a seat 21 (see FIG. 2) for one of the separator plates which may thus be the one that is not axially movable along the shaft 9.

The granular filter material 3 filled into the at least one compartment A may comprise soda lime or other suitable granular filter material depending on the filter purpose as described before and as known in the art. The form of the filter media may be for example irregular granular particles, spherical or non-spherical particles. Suitable filter material for $CO_2$ absorption are for example LiOH or sodalime. For the absoprtion of organic molecules suitable filter materials may be selected from granular activated carbon or zeolithe and combinations thereof.

Figure 2:
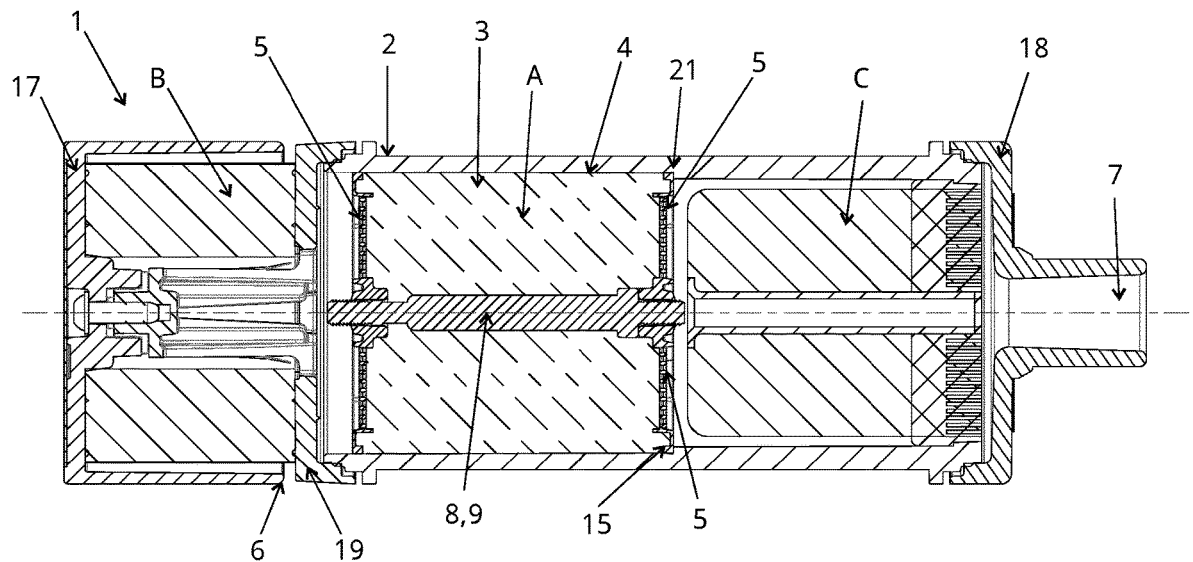
FIG. 2 is a cross-sectional view of the vent filter cartridge of FIG. 1.

The vent filter or vent filter cartridge 1 according to the invention may comprise a further compartment B upstream of the at least one compartment A containing the granular filter material 3 and/or a further compartment C downstream of the at least one compartment A with respect to the flow direction of the air through the vent filter 1 from the inlet 6 to the outlet 7 (see FIG. 2). The upstream compartment B may contain a filter to filter volatile organic and inorganic substances or solvents or particles, and the downstream compartment C may contain a filter for filtering bacteria, dust and other particles.

Figure 3:
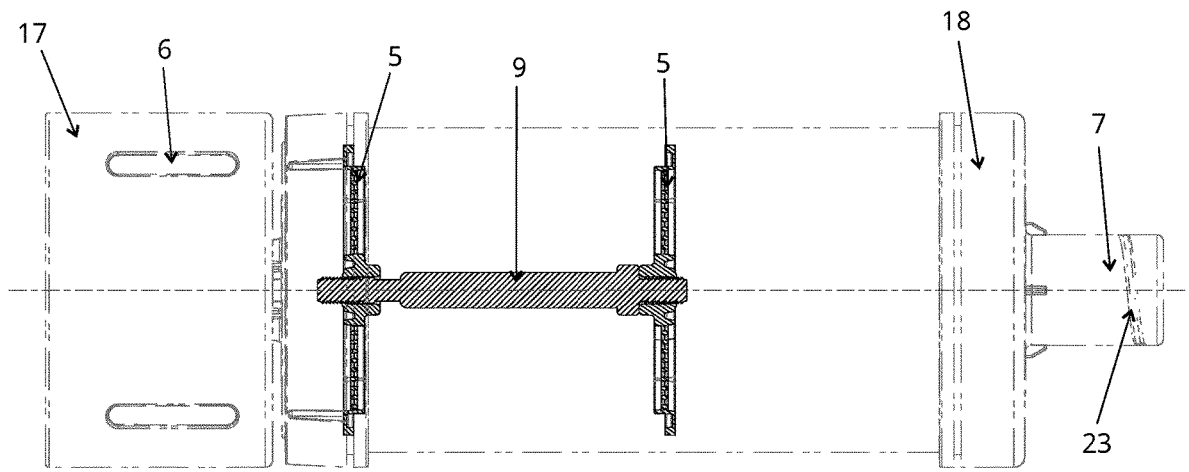
FIG. 3 is a partial sectional view of the vent filter cartridge of FIGS. 1 and 2.

In the preferred embodiment as shown in FIGS. 2 and 3 the inlet 6 and the outlet 7 are respectively formed on separate lid or end members or covers 17, 18. The downstream compartment C in the preferred embodiment is integrated into the inner volume of the shell 2. The upstream compartment B is received in the lid member 17. This is advantageous in that the compartments may be opened and are easily accessible for filter replacement and it facilitates the mounting.

A further lid member or cover 19 with a communication opening for the air may be provided to close part of an axial end of the shell 2 on the side of the movable separator plate 5 as show in FIG. 2. The lid members 17, 18 and the further lid member or cover 19, if provided, are preferable non-removably attached to the shell 2 to close the respectively axial ends thereof, by vibration or thermal or ultrasonic welding.

The inlet 6 in this embodiment is in the form of a plurality of axially extending long-holes formed in the lid member 17 on an outer circumferential surface thereof (see FIGS. 1 and 3). This arrangement is preferable as it does not require further space on the axial end of the lid member in the mounted state on a tank. The inlet 6 may be, however, formed in a variety of configurations determined just by the requirement of introducing a sufficient amount of air into the vent filter and allowing the air to pass through the compartment(s) in sequential order.

The outlet 7 in this case is formed on the lid member 18 and is provided in the form of a central hub or port. As shown in FIG. 3 an outer peripheral surface of the port is provided with a thread-like feature 23 for allowing a simple engagement/disengagement of the cartridge with a mating holder or receptacle on a tank. Other connecting means in the form of a bayonet or by means of a separate locking member are feasible.

Since the shaft 9 supports the separator plates in a fixed axial spacing, the sealing effect at the outer peripheral rim of the separator plates 5 with respect to the inner peripheral wall 4 of the shell 2 does not have to be very tight as the forces imparted on the separator plates are mainly born by the central shaft 9.

Although a single central shaft 9 is used in the preferred embodiment, a plurality of shafts, preferably equally distributed about the circumference are possible, in particular in connection with the locking mechanism with the notching that allows movement and fixation of the separator plates along the axial direction in a plurality of defined positions without a rotational movement thereof.

The vent filter is in the form of a self-supporting cartridge that can be easily mounted to and removed from a corresponding receptacle or holder on the tank.

In order to reduce the head space requirement for the vent filter above the tank, the vent filter cartridge of the invention can be mounted in a position on the top side of the tank such that the axial direction of the cylindrical shell of the vent filter extends in a substantially horizontal orientation. In this orientation the vent filter can be mounted and replaced by horizontal movement from a front side.

In a preferred embodiment (not shown) the pure liquid storage tank designed for use with the filter cartridge of the invention may be provided with a link member for connecting the vent filter cartridge to the tank so as to allow a pivotal movement of the vent filter into and from the horizontal orientation, i.e. from a horizontal working orientation to a substantially vertical orientation in order to facilitate the replacement of the vent filter cartridge and/or allow operation in such upright or vertical orientation. The link member may provide a direct communication between the outlet 7 for filtered air of the vent filter cartridge and the interior volume of the tank, but may be functionally combined with a valve or switch that is opened once the vent filter cartridge is pivoted in a particular working orientation. This allows for an exchange or replacement of the filter cartridge in the closed position of the valve without the risk of contaminating the interior volume of the tank during a replacement of the vent filter cartridge.

The invention claimed is:
1. A vent filter, comprising:
  a cylindrical shell;
  at least one compartment for accommodating granular filter material, said at least one compartment defined between an inner peripheral surface of the shell and a pair of spaced apart separator plates arranged in the shell such that the spacing of the separator plates in the axial direction of the shell can be changed and fixed so as to apply a direct pressure on the granular filter material in the at least one compartment; and an air inlet and an air outlet respectively arranged to allow a flow of air through the granular filter material in the at least one compartment;

said vent filter further comprising a support member extending in an axial direction of said cylindrical shell and a locking mechanism for allowing fixing of at least one of the separator plates in a plurality of defined positions in the axial direction of the shell on the support member.

2. The vent filter according to claim 1, wherein the at least one of the separator plates respectively comprises a frame and a screen supported by the frame, wherein the screen is configured to be air permeable and to retain the granular filter material.

3. The vent filter according to claim 2, wherein the frame comprises a circumferential rim configured to slidingly seal against the inner peripheral surface of the shell.

4. The vent filter according to claim 1, wherein the support member comprises a shaft extending in the axial direction of the shell and supporting the at least one of the separator plates thereon.

5. The vent filter according to claim 4, wherein the separator plate(s) has/have a hub supported on the shaft so as to be movable in the axial direction.

6. The vent filter according to claim 5, wherein the locking mechanism comprises one or more protrusions provided on the hub and configured to be engaged with plural recesses provided on the shaft to define the plural axial fixing positions for the hub.

7. The vent filter according to claim 1, wherein the separator plates are identical.

8. The vent filter according to claim 1, wherein said at least one compartment contains said granular filter material, and wherein the granular filter material comprises soda-lime, activated carbon, LiOH and/or zeolite.

9. The vent filter according to claim 1, comprising a further compartment upstream and/or downstream of the at least one compartment with respect to the flow direction of air through the vent filter from the inlet to the outlet.

10. The vent filter according to claim 1, wherein the inlet and/or the outlet is/are respectively formed on a lid member to close a respective axial end opening(s) thereof.

11. A pure liquid storage tank, comprising a vent filter according to claim 1 having the outlet communicating with the interior volume of the tank and arranged on a top side of the tank such that the axial direction of the cylindrical shell of the vent filter extends in a substantial horizontal direction.

12. The pure liquid storage tank according to claim 11, comprising a link for connecting the vent filter to the tank so as to allow pivotal movement of the vent filter into and from the substantial horizontal orientation.

13. The vent filter of claim 4, wherein said shaft is a central shaft.

14. The vent filter of claim 10, wherein the inlet and/or the outlet is/are respectively formed on the lid member non-removably attached to the shell.

15. The vent filter according to claim 1, wherein each separator plate of said pair of separator plates is axially movable.

* * * * *